(12) United States Patent
Doy

(10) Patent No.: US 10,005,395 B2
(45) Date of Patent: Jun. 26, 2018

(54) CONTROL SYSTEM FOR LADDER AND MACHINE USING THE SAME

(71) Applicant: Caterpillar Inc., Peoria, IL (US)

(72) Inventor: Nathaniel Doy, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 17 days.

(21) Appl. No.: 14/945,777

(22) Filed: Nov. 19, 2015

(65) Prior Publication Data

US 2017/0144604 A1 May 25, 2017

(51) Int. Cl.
*B60R 3/02* (2006.01)
*E02F 9/20* (2006.01)
*E06C 5/44* (2006.01)
*E02F 9/24* (2006.01)

(52) U.S. Cl.
CPC .................. *B60R 3/02* (2013.01); *E02F 9/24* (2013.01); *E06C 5/44* (2013.01)

(58) Field of Classification Search
CPC ........... B60R 3/00; B60R 3/002; B60R 3/005; B60R 3/007; B60R 3/02; B60R 3/04; E02F 9/0833; E02F 9/24
See application file for complete search history.

(56) References Cited

U.S. PATENT DOCUMENTS

| | | | | |
|---|---|---|---|---|
| 3,883,844 A * | 5/1975 | Wood, II | ................... | B60R 3/02 200/61.44 |
| 3,963,095 A * | 6/1976 | Hedges | ................. | B66F 11/046 182/2.5 |
| 5,311,966 A * | 5/1994 | Daniels | ................... | B61D 49/00 182/128 |
| 5,780,936 A * | 7/1998 | Cardello | ................... | E06C 5/36 187/232 |
| 5,988,316 A * | 11/1999 | Hedley | ..................... | B60R 3/02 182/127 |
| 6,178,364 B1 * | 1/2001 | Delurey | .................... | B60R 3/02 105/443 |
| 6,264,222 B1 * | 7/2001 | Johnston | ................... | B60R 3/02 105/444 |
| 7,472,663 B1 * | 1/2009 | Horn | ..................... | A01C 7/208 111/200 |
| 7,905,324 B2 | 3/2011 | Gil et al. | | |
| 8,011,474 B2 | 9/2011 | Boroski et al. | | |
| 8,881,867 B2 * | 11/2014 | Takenawa | ............. | E02F 9/0833 182/127 |
| 8,919,497 B2 | 12/2014 | Rund | | |
| D760,725 S * | 7/2016 | Brush | .......................... | D14/485 |
| 9,649,984 B2 * | 5/2017 | Edelen | ...................... | B60R 3/02 |
| 2001/0030081 A1 * | 10/2001 | Morimoto | ................. | B60R 3/02 182/85 |
| 2008/0099282 A1 * | 5/2008 | Boroski | ................ | E02F 9/0833 187/203 |
| 2010/0116590 A1 * | 5/2010 | Rund | ........................ | E06C 5/04 182/127 |
| 2011/0153170 A1 * | 6/2011 | Dishman | ................. | E02F 3/844 701/50 |
| 2012/0145480 A1 * | 6/2012 | Willis | ....................... | E06C 5/06 182/106 |

(Continued)

*Primary Examiner* — Daniel P Cahn

(57) ABSTRACT

A machine includes a machine body that includes an operator platform. The machine also includes an implement, a ladder moveable between a deployed position and a stowed position, and control unit configured to limit operation of the implement when the ladder is in the deployed position.

8 Claims, 5 Drawing Sheets

(56) References Cited

U.S. PATENT DOCUMENTS

| | | | |
|---|---|---|---|
| 2012/0158209 A1* | 6/2012 | Doy | B60T 8/172 701/1 |
| 2012/0181109 A1* | 7/2012 | Rund | E06C 5/04 182/97 |
| 2013/0151086 A1* | 6/2013 | Shockency, Jr. | B60T 8/172 701/50 |
| 2014/0156105 A1* | 6/2014 | Faivre | G07C 5/00 701/1 |
| 2014/0156152 A1* | 6/2014 | Faivre | G05D 1/00 701/50 |
| 2014/0156162 A1* | 6/2014 | Faivre | B60W 50/0098 701/84 |
| 2014/0203535 A1* | 7/2014 | Eckl | B60R 3/02 280/166 |
| 2015/0240452 A1* | 8/2015 | Faivre | E02F 9/2079 701/50 |
| 2015/0330057 A1* | 11/2015 | Faivre | E02F 3/7618 701/50 |
| 2017/0335543 A1* | 11/2017 | Johnson | E02F 9/0833 |

\* cited by examiner

CONTROL SYSTEM FOR LADDER AND MACHINE USING THE SAME

TECHNICAL FIELD

The present disclosure relates generally to machines, and more particularly to a control system for a ladder on a machine.

BACKGROUND

A variety of track type tractors, front-end loaders and other relatively large machines include a cab mounted on a machine body. An operator sits inside the cab, from which he or she can drive and operate the machine. Access to the cab is typically by way of steps or a ladder on the side of the body, allowing an operator or service technician to climb to an operator platform adjacent to or surrounding the cab.

Such machines often operate in rugged terrain such as above-ground and underground mines, construction and demolition sites and similarly extreme environments, subjecting the machine and machine body to constant wear and tear. For example, a track type tractor pushing a large pile of rubble may be travelling essentially through a sea of rock to clear a path across a work surface. Thus, virtually all machine components are robust and durable to withstand the frequent scrapes, impacts and other forces encountered during operation.

Access systems such as ladders and steps can be located on the exterior of the machine. Accordingly, as a machine operates, the external ladders, steps, etc. can be damaged by rock, trees and other materials through which the machine passes. A ladder extending to the side of a machine can be shorn off by passing work material. Similarly, steps on the side of the machine can be dented, scraped, smoothed or otherwise rendered unsuitable for easy access or egress to the machine cab by an operator. Further, the ladder can be damaged or torn off if the operator lifts the blade of the machine without stowing the ladder.

The above concerns have prompted designers to propose various means for accessing the cab via a retractable or otherwise displaceable ladder system. When the operator needs to climb to or from the cab, a ladder can be deployed as needed. When the machine is operating, the ladder can supposedly be stowed out of the way. One access ladder design is known from U.S. Pat. No. 5,988,316 to Hedley. Hedley '316 includes a powered ladder system pivotably connected to a rotary axle. Hedley '316 proposes moving the ladder between a use position and a storage position by initially rotating the ladder in a first direction, pivoting the same upwardly, then rotating the ladder in a second direction and eventually stowing the same. Hedley '316 thus uses a relatively complex process, requiring a plurality of steps and rotational axes to stow or deploy the ladder.

SUMMARY OF THE INVENTION

The disclosure relates to a machine, a control system, and a method of controlling a ladder. The machine can include a machine body that includes an operator platform; an implement; a ladder movable between a deployed position and a stowed position; and a control unit configured to limit operation of the implement when ladder is in the deployed position.

The control unit can be configured to generate a warning to an operator when the ladder is in the deployed position. The warning can be provided on a screen or with an alarm.

The control unit can be configured to provide an override to the operator to continue operation of the implement when the ladder is in the deployed position.

The control unit can be configured to raise the ladder from the deployed position to the stowed position.

DETAILED DESCRIPTION

Figure 1:
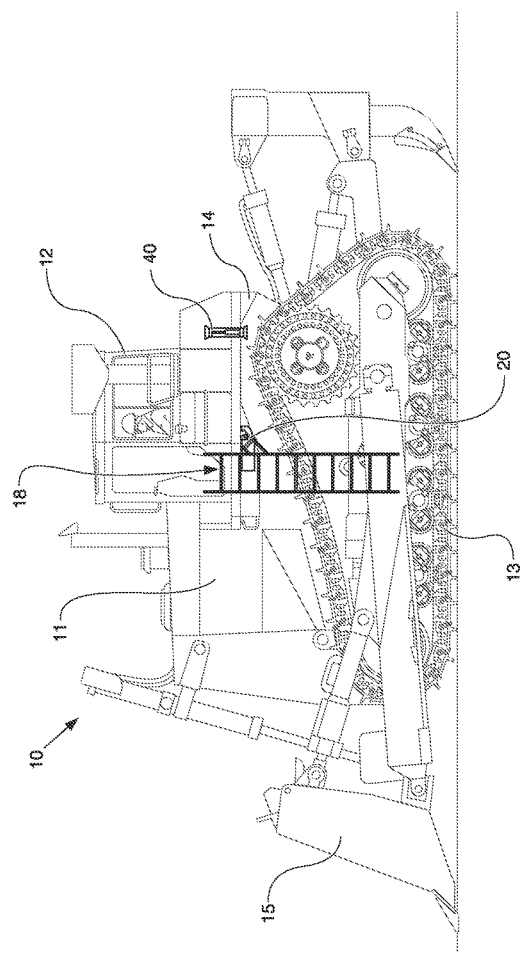
FIG. 1 is a side diagrammatic view of a machine according to a preferred embodiment of the present disclosure.

Referring to FIG. 1, there is shown a side view of a machine 10 according to an embodiment of the present disclosure. Machine 10 includes a machine body 11 having a cab 12 and an operator platform 14. Machine 10 is preferably a mobile machine such as a track type tractor, including a track 13 and an implement 15. In an embodiment, the implement 15 can comprise a blade. However, the implement 15 can also comprise other tools which may be useful for work performed by the machine 10. The machine 10 also comprises a ladder assembly 18, allowing an operator to access the cab 12, for example, via an operator platform 14. The ladder assembly 18 includes a hinge mechanism 20 for actuation between the vertical deployed position and a horizontal stowed position (not shown). The hinge mechanism 20 can be a powered hinge mechanism. The "operator platform 14" can encompass a broad range of designs. For example, the operator platform 14 can comprise a system wherein a true platform extends around the cab 12 and an operator stands or moves about thereon after utilizing the ladder assembly 18, as well as a system in which the ladder assembly 18 allows an operator to climb directly into cab 12. Thus, the floor of the cab 12 could be considered to be part of the operator platform 14.

Figure 2:
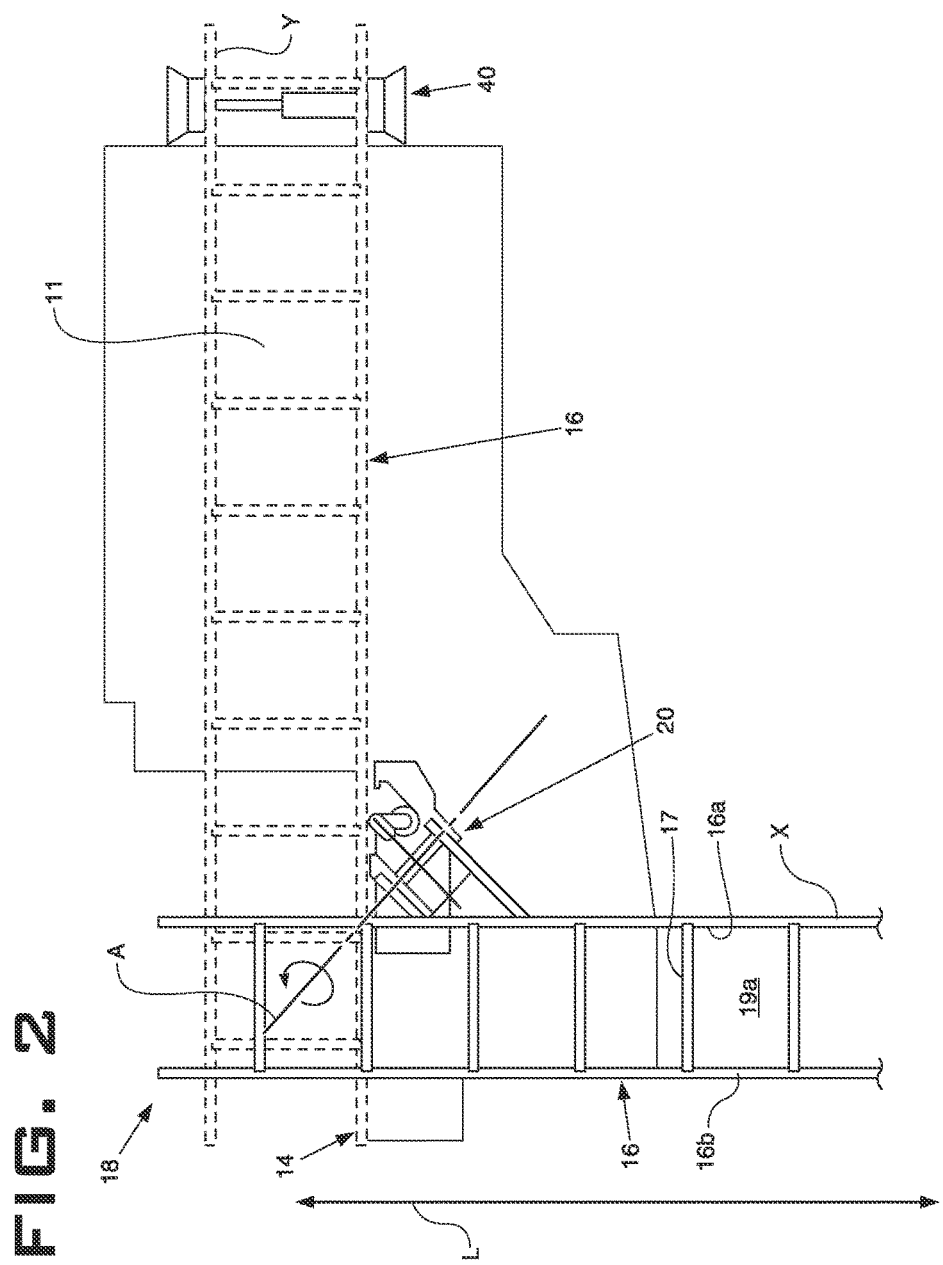
FIG. 2 is a partial diagrammatic view of the machine access ladder assembly for the machine of FIG. 1.

Turning to FIG. 2, the ladder assembly 18 is shown in greater detail, in a deployed position at which an operator can use the ladder assembly 18 to access operator platform 14. The ladder assembly 18 preferably includes a ladder 16 having elongate first and second rails 16a and 16b, respectively, having a plurality of steps 17 extending between the first and second rails 16a and 16b. Furthermore, the first and second rails 16a and 16b may be substantially parallel to each other. In addition the steps 17 may be substantially perpendicular to the first and the second rails 16a and 16b. The ladder 16 is coupled to the machine body 11 with the hinge mechanism 20, defining a hinge axis "A". In one embodiment, the hinge axis A is oriented diagonally relative to a vertical line "L", and also diagonally oriented relative to the first and the second rails 16a and 16b.

The ladder 16 rotates on the hinge mechanism 20, about the hinge axis A between the deployed position (X) and a stowed position (Y). The ladder 16 may be deployed such that the ladder 16 rests against and is supported on the ground. Alternatively, the ladder 16 might be suspended above the ground when deployed. In such an embodiment, stops or some other support might be provided against which the ladder 16 rests in its deployed position, or the ladder 16 might be supported solely by the hinge mechanism 20.

As previously noted, FIG. 2 illustrates the ladder assembly 18 in a stowed position wherein the ladder 16 has been rotated on the hinge mechanism 20 to a position at which it extends generally parallel to the operator platform 14. However, in an embodiment, other suitable stowed orientations would be acceptable. In moving the ladder assembly 18 between the deployed and stowed positions, the ladder 16 preferably rotates at least about 90°. The rotation angle may be based on a desired orientation of the ladder 16 in the deployed position, as well as the orientation of the same in its stowed position.

The ladder 16 need not extend exactly parallel to operator platform 14 in its stowed position, nor exactly parallel to vertical line "L" in its deployed position, as illustrated. In alternative embodiments the structure of the machine body 11 may be such that the ladder 16 can be stowed and deployed at lesser or greater angles relative to the structures and orientations described. Further still, while a ladder has been illustrated having the first and second rails 16a and 16b, with steps 17 extending perpendicularly between the first and second rails 16a and 16b, alternative ladder configurations are possible, such as rails that narrow in the direction of the cab. The ladder assembly 18 thus provides a system wherein the ladder 16 can be moved between its deployed and stowed positions in a single motion, restricted by the diagonal hinge axis A. Rather than requiring plural steps to deploy or stow the ladder 16, the ladder 16 can be swung through an arc that moves it the entire requisite distance, rather than sequentially through plural axes as in the prior art.

Track type tractors and other machines such as the machine 10 often operate over steep grades and rough surfaces. When the ladder 16 is pivoted to its stowed position, it may thus be desirable to secure an end of the ladder remote from the hinge mechanism 20. Referring to FIG. 2, there is shown a latch mechanism or a cradle 40 for securing the ladder 16 in its stowed position.

When the ladder 16 is in its deployed position, the implement 15 can damage the ladder 16 when the implement 15 is lifted. To prevent that damage, the machine 10 can include a control unit 22 configured to alert the operator to the position of the ladder 16 when the operator starts to move the machine 10 or the implement 15. Further, the control unit 22 can be configured to limit operation of the machine 10 or the implement 15 when the ladder 16 is in the deployed position. For example, the control unit 22 may allow the implement 15 to move, but limit the angle or lift of the implement. In one embodiment, the control unit 22 may allow operation of the implement 15, but limit the lift of the implement 15 to below where damage to the ladder 16 would occur. In addition, the control unit 22 can be configured to prevent operation of the machine 10 or the implement 15 when the parking brake is released and the ladder 16 is in its deployed position. In an embodiment, the machine 10 can include one or more sensors configured to detect a position of the ladder 16, a position of the parking brake, or any combination thereof.

Figure 3:
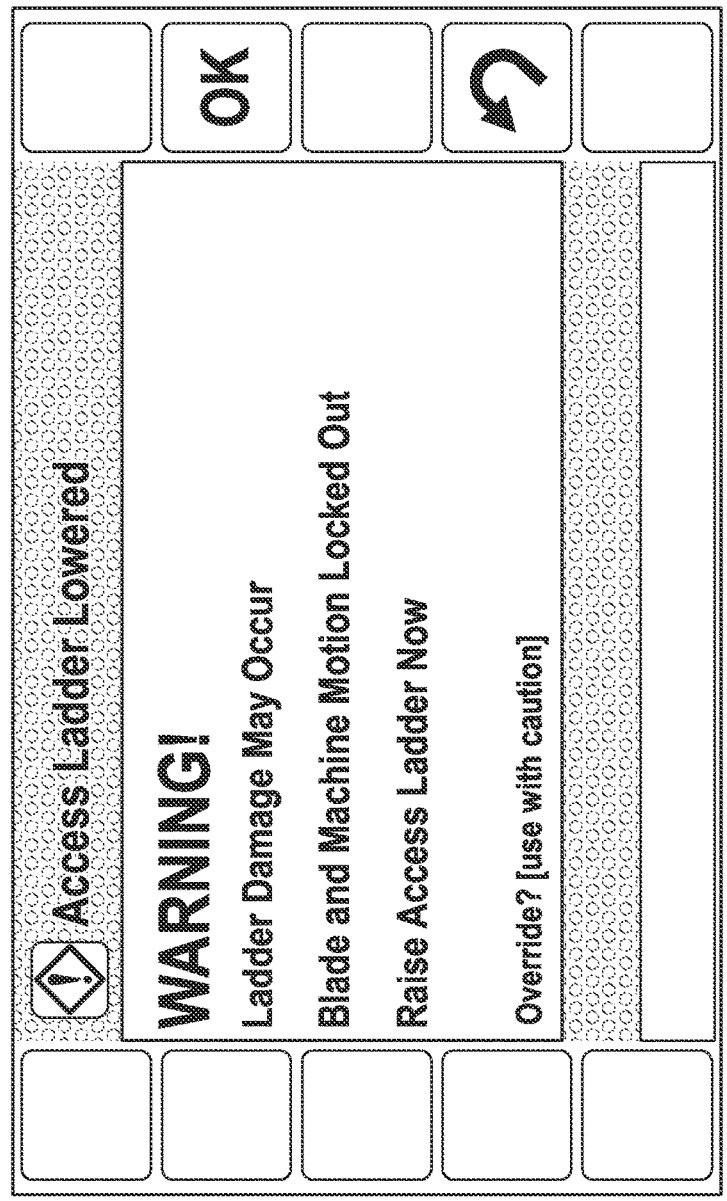
FIG. 3 is an example of a warning generated by the control unit as displayed on a screen.

The control unit 22 can also alert the operator that the ladder 16 is in its deployed position by generating a warning. In an embodiment, the warning can be an audio or visual warning. For example, the warning can be displayed on a screen, such as a display or touch screen, as shown in FIG. 3. The warning can also be an alarm, such as a siren, a blinking light, or beeping noises. The control unit 22 can also provide the operator with an override option enabling the operator to continue operation of the machine 10 or the implement 15 even when the ladder 16 is in its deployed position.

Figure 5:
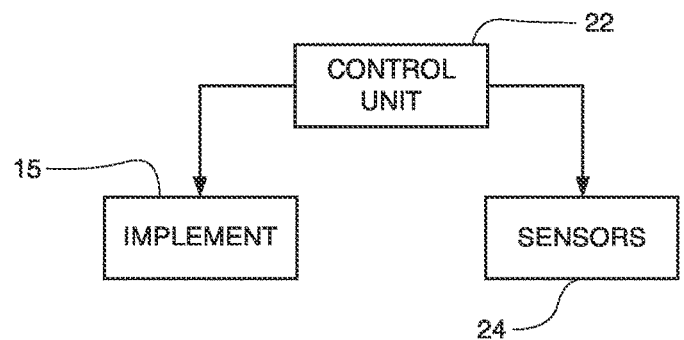
FIG. 5 is a diagram of the control unit.

Referring to FIG. 5, the control unit 22 receives input from sensors 24 that provide the control unit 22 with information about the position of the ladder 16. Specifically, sensors 24 transmit data to the control unit 22 whether the ladder 16 is deployed or stowed. If the ladder 16 is deployed, the control unit 22 limits operation of the implement 15. For example, the control unit 22 can prevent movement of the implement 15 or the control unit 22 can prevent the implement 15 from lifting up after a certain angle. The control unit 22 can, therefore, prevent the implement 15 from lifting up to a point where the implement 15 will cause damage to the ladder 16. In some embodiments, the control unit 22 can be configured to move the ladder 16 from its deployed position to its stowed position when an operator starts to move the machine 10 or the implement 15.

Referring to FIGS. 1-3 generally, the ladder 16 can be stored in its deployed position when the machine 10 is not in use. In certain circumstances, it may be desirable to stow the ladder 16 between operations, such as for security reasons. For such situations, the machine 10 may be equipped with a key or electronic code system, which may be wireless, accessible to a person standing on the ground, and operable to deploy the ladder 16 from the cradle 40, and actuate the hinge mechanism 20. From the ground, an operator may therefore climb the ladder 16, and subsequently move the same to its stowed position.

INDUSTRIAL APPLICABILITY

As described, a control unit 22 can be configured to alert an operator when the ladder 16 is in its deployed position and the operator starts to move the machine 10 or the implement 15.

The control unit 22 can generate a warning to enable the operator to retract the ladder 16. In addition, the control unit 22 can be configured to prevent operation of the machine 10 or implement 15 when the ladder 16 is in its deployed position. Thus, the control unit 22 can prevent damage to the ladder. Furthermore, the control unit 22 may also allow the operator to override the warning. This can provide the operator with flexibility in operating the machine 10.

Figure 4:
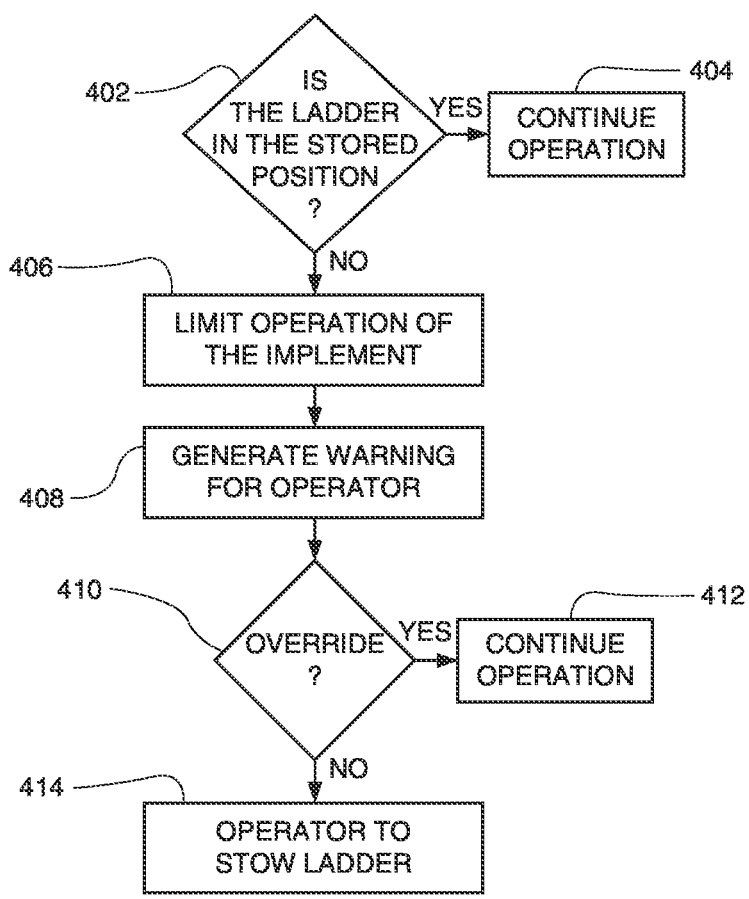
FIG. 4 is a flowchart of the method of controlling ladder.

In an embodiment, FIG. 4 discloses a method of controlling a ladder on a machine. At block 402, the method includes determining whether the ladder 16 is in the deployed or stowed position. If the ladder 16 is stowed, the method may proceed to block 404 where the operator can continue to operate the machine 10 and the implement 15. If the ladder 16 is deployed, the method may proceed to block 406 where the control unit 22 will limit operation of the implement 15, generate a warning for the operator in block 408 and provide an override option to the operator in block 410. If the operator overrides the warning, the method may proceed to block 412 where the operator can continue to operate the machine 10 and the implement 15. If the operator does not override the warning, the method may proceed to block 414 where the operator can then stow the ladder 16. Other aspects, features and advantages will be apparent upon an examination of the attached Figures and appended claims.

The present description is for illustrative purposes only, and should not be construed to narrow the breadth of the present disclosure in any fashion. Thus, those skilled in the art will appreciate that various modifications might be made to the presently disclosed embodiments without departing from the intended spirit and scope of the present disclosure.

What is claimed is:

1. A tractor comprising:
 a machine body that defines a front end, a rear end, a top end, a bottom end, and two sides, the machine body including an operator platform on the top end;
 an implement that includes a blade, the implement being positioned in front of the front end, the implement being configured to be pivotally raised and lowered between a lowered position, a ladder safety position, and an upper position, wherein a height of the ladder safety position is located between a height of the upper position and a height of the lowered position;
 a ladder directly attached to one of the two sides, wherein the ladder is configured to move between a deployed position and a stowed position, the ladder substantially vertical in the deployed position and substantially horizontal in the stowed position;
 a parking brake configured to move between a released position and a use position; and
 a control unit configured to:
  determine that the ladder is in the deployed position and that the parking brake is in the released position, and
  based on the determining, limit raising and lowering of the implement to positions between the lowered position and the safety ladder position while preventing the implement from moving passed the safety ladder position towards the upper position in order to prevent damage to the ladder, wherein said limiting of the raising and the lowering of the implement is configured to be performed while the tractor is on an angled grade and on a horizontal surface.

2. The tractor of claim 1 wherein the control unit is configured to generate a warning to an operator when the ladder is in the deployed position.

3. The tractor of claim 2 wherein the warning is displayed on a screen.

4. The tractor of claim 2 wherein the warning is an alarm.

5. The tractor of claim 2 wherein the control unit is configured to raise the ladder from the deployed position to the stowed position.

6. The tractor of claim 2 wherein the control unit is configured to provide an override to the operator,
 wherein the override enables the operator to continue operation of the implement when the ladder is in the deployed position.

7. The tractor of claim 1 wherein the implement is a blade.

8. The tractor of claim 1 wherein the ladder is configured to pivot about 90° between the deployed position and the stowed position.

* * * * *